United States Patent

[11] 3,566,013

[72] Inventor Albert Macovski
Palo Alto, Calif.

[21] Appl. No. 760,444
[22] Filed Sept. 18, 1968
[45] Patented Feb. 23, 1971
[73] Assignee RCA Corporation

[54] OPTICAL REDUCTION OF LUMINANCE TO CHROMINANCE CROSSTALK IN COLOR TELEVISION CAMERAS

16 Claims, 3 Drawing Figs.

[52] U.S. Cl. .......... 178/5.4
[51] Int. Cl. .......... H04n 9/06
[50] Field of Search .......... 178/5.4, 5.4 (STC), 5.4 (7), 5.4 (9); 350/162 (S.F)

[56] References Cited

UNITED STATES PATENTS

| | | | |
|---|---|---|---|
| 2,705,258 | 3/1955 | Lesti | 178/5.4 |
| 2,733,291 | 1/1956 | Kell | 178/5.4 |
| 2,907,817 | 10/1959 | Teer | 178/5.4 |
| 3,378,633 | 4/1968 | Macovski | 178/5.4 |

*Primary Examiner*—Robert L. Richardson
*Attorney*—Eugene M. Whitacre

ABSTRACT: In a color television camera of a type utilizing a color-encoding filter in the light path of an image pickup tube to derive signals representative of the color components of an image, crosstalk of the higher frequency luminance signals into the chrominance signals adversely affects the quality of the color representative signals. Apparatus, in the optical path, is provided for reducing the high frequency luminance signals in a horizontal direction so that the crosstalk between the luminance and chrominance signals is reduced.

INVENTOR
Albert Macovski

BY Eugene M. Whitacre
ATTORNEY

OPTICAL REDUCTION OF LUMINANCE TO CHROMINANCE CROSSTALK IN COLOR TELEVISION CAMERAS

BACKGROUND OF THE INVENTION

This invention relates to apparatus for reducing the luminance to chrominance crosstalk in a color television camera.

In a color television camera light from an image directed to a pickup tube may be processed in such a manner that the electrical signals produced by the tube in response to the light image may be separated to form the electrical color component signals necessary to produce a composite waveform which may then be used to reproduce the image in a color television receiver.

It is known that a color-encoding filter may be placed in the light path of a pickup tube to separate the light passing through it into color component light signals, which signals then impinge upon the photosensitive element of the pickup tube and are derived as electrical signals from the tube as an electron beam scans a raster at the target.

The color-encoding filter may be of any one of several types known in the art. For example, the encoding filter may comprise strips of several primary colors with transparent areas for passing the primary color signals and the luminance signal, or strips of subtractive primary colors alternating with gray strips to yield color difference signals and the luminance signal. For convenience, the present invention will be described in an embodiment utilizing a color-encoding filter of a type described in U.S. Pat. No. 3,378,633 to A. Macovski, which color-encoding filter comprises a grid of vertical parallel spaced lines of one subtractive primary color and a second grid of parallel spaced lines of a second subtractive primary color angularly superimposed over the first grid, both grids having the same line density. If the strips of the first grid were cyan and the strips of the second grid were yellow, vertical parallel strips of —R light and angularly disposed strips of —B light will be shadowed on the photosensitive element of the tube. These color component light signals will be derived from the tube as electrical signals, the —R signal having a frequency determined by the cyan line density and the —B signal having a frequency determined by the yellow line density and the angular disposition of the yellow strips from the vertical cyan strips. The line density of the filter strips may be about 270 lines per inch, and the angular disposition of the second grid relative to the first may be about 45°, which arrangement will yield a —R signal of about 5.0 mc. and a —B signal of about 3.5 mc. The material between the cyan and yellow strips in each grid of the filter may be transparent to all of the red, green and blue primary colors and thus pass light representative of the brightness or luminance of the image. The color component and luminance signals may then be electrically separated by circuitry external to the pickup tube. The separate signals are then processed in a manner to produce waveforms for direct application to a color receiver or to produce a composite waveform conforming to broadcasting standards for application to a transmitter.

One problem encountered in the operation of a color camera as described above is the crosstalk between the high frequency luminance signals and the chrominance signals. It can readily be seen how those portions of the encoding filter passing the luminance signals will pass luminance signal components having frequencies as high as the color component signals. The luminance signals giving detail in a vertical direction present no serious problem because of the relatively low frame rate, but the luminance detail in the horizontal direction produces the higher frequency signals which will undesirably add to the chrominance signals and thereby adversely affect the color characteristics of the reproduced image. In a color camera utilizing a color-encoding filter in the optical path it is desirable to reduce the higher frequency luminance signals in a horizontal direction before the color component light signals are obtained in order to reduce the luminance to chrominance crosstalk.

SUMMARY OF THE INVENTION

In a color television camera utilizing a color-encoding filter disposed in the light path of a pickup tube having a scanning beam whereby the encoding filter separates light from an image into its component colors, an astigmatic filter having alternate and parallel strips of different transmissivity and having a spatial frequency cutoff around the carrier frequency of the lowest frequency color component carrier signal derived from the pickup tube is disposed in the optical path between the camera lends and the color-encoding filter to reduce the high frequency luminance signals in a horizontal direction and thereby reduce crosstalk between the high frequency luminance signals and the chrominance signals.

It is an object of this invention to provide an astigmatic filter in the light path of a color television camera whereby the high frequency luminance signal components in a horizontal direction are reduced so that the crosstalk between the high frequency luminance signals and the chrominance signals is reduced.

The invention is more fully described in the following specification and claims taken in conjunction with the accompanying drawing in which:

DESCRIPTION

Figures 1, 2, 3:
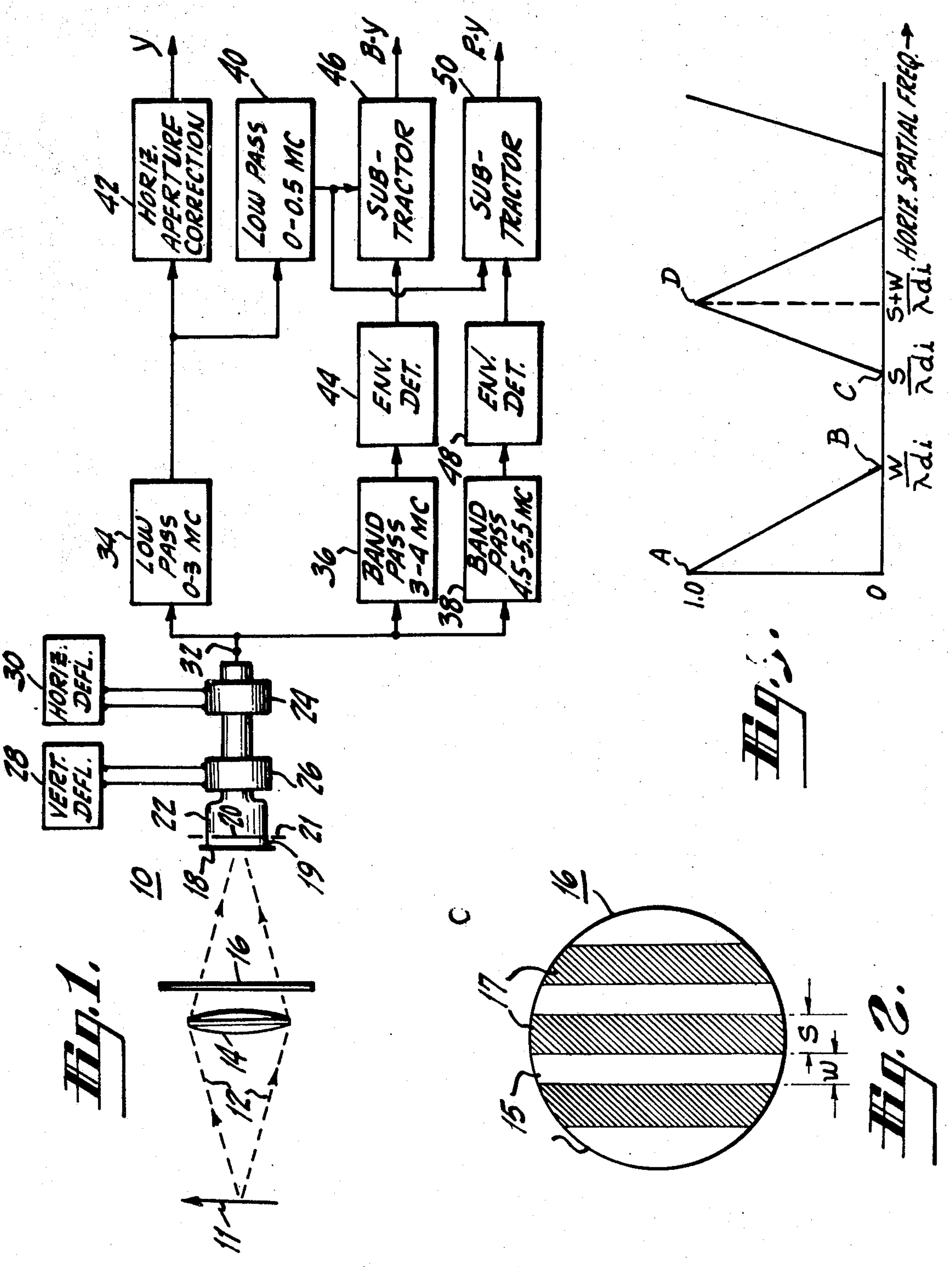
FIG. 1 is a functional block diagram of that portion of a television camera embodying the invention.
FIG. 2 shows the astigmatic filter used in FIG. 1 according to the invention.
FIG. 3 shows the horizontal spatial frequency response at the photosensitive surface of an image pickup tube as a result of the astigmatic filter used according to the invention.

FIG. 1 shows that portion of a single-tube color television camera 10 necessary for an understanding of the invention. Light rays 12 from a scene 11 to be televised pass through camera lens 14 and are focused at the image plane 21 located at the photosensitive surface 20 of pickup tube 22. An astigmatic filter 16 is located at the exit pupil of lens 14 and a color encoding filter 18 is mounted adjacent the faceplate 19 of pickup tube 22. Pickup tube 22 may be vidicon, for example, in which case the photosensitive surface 20 is the photocathode. It is to be understood that suitable sources of operating potential are connected to the various elements of tube 22 in a conventional manner.

A source 28 of vertical deflection waveforms provides vertical scanning current for vertical deflection coils 26. A source 30 of horizontal deflection waveforms provides horizontal scanning current for horizontal deflection coils 24. The deflection coils direct the electron beam of tube 22 over the target to form a raster scan. The output signal of the pickup tube 22 is taken from output terminal 32 and applied simultaneously to a low-pass filter circuit 34 and to band-pass filter circuits 36 and 38, each filter circuit having the band-pass indicated in its respective block in FIG. 1. The band-pass of respective filters 36 and 38 includes the carrier frequency generated by the corresponding grids of encoding filter 18. The output of filter circuit 34 is applied to low-pass filter circuit 40 having a band-pass from 0 to 0.5 mc. The output of low-pass filter circuit 40 is applied simultaneously to subtractor circuit 46 and subtractor circuit 50. The output of filter circuit 34 is also applied to a horizontal aperture correction circuit 42. The output of band-pass filter 36 is applied to envelope detector 44, the output of which is applied to subtractor circuit 46. The output of band-pass filter circuit 38 is applied to envelope detector 48, the output of which is applied to subtractor circuit 50.

The output of horizontal aperture correction circuit 50 is the Y, or luminance signal, to which horizontal detail has been added. The output of subtractor 46 is the B-Y signal and the output of subtractor 50 is the R-Y signal. These signals may be combined with a subcarrier in conventional manner to produce a composite waveform representative of the luminance and chrominance components of the televised scene.

In operation, the light rays 12 of a scene 11 to be televised are directed by camera lens 14 through the astigmatic filter 16. Astigmatic filter 16 is shown in detail in FIG. 2. The filter has alternate and parallel strips 15 and 17 forming a grating. Strips 15 have greater transmissivity than strips 17. For example, strips 15 may be transparent and strips 17 may be of neutral density material. The density of strips 17 is selected to establish the reduction of the luminance signal in the portion B to C of FIG. 3 as explained below. The filter 16 is disposed at the exit pupil of lens 14, which, as a practical matter, may be considered the last surface of the objective lens towards the pickup tube 20. The filter 16 is further disposed so that the strips are vertical, or perpendicular to the scanning lines of the raster of the pickup tube, thereby altering the horizontal spatial frequency spectrum at the image plane 21.

As previously mentioned, it is undesirable to have the higher frequency luminance signals, representing image detail in a horizontal direction, cross talk into the chrominance signals. With the astigmatic filter disposed as previously mentioned, the effect of the filter on light passing through it will be to cut off the horizontal spatial frequency response at the image plane 21 at frequencies determined by the width of the grating strips 15 and 17 and the distance of the grating from the image plane. A detailed mathematical analysis of this phenomena may be found in standard texts dealing with light and optics. Such an explanation is given in Chapter 9of Modern Optics by Brown, Reinhold Publishing Company (1965).

The color-encoding filter 18, as described in the previously mentioned Macovski patent, any have the line density and angular disposition of the superimposed cyan-transparent and yellow-transparent grids such that the –R light component signal and the –B light component signal are at carrier frequencies of 5.0 mc. and 3.5 mc. respectively. This being the case, then it is desirable to reduce the amplitude of the high frequency luminance signals in the spatial frequency spectrum containing the chrominance signals to prevent the crosstalk of the high frequency luminance signals into the chrominance signals.

The relationship between the width of the strips in filter 16 and the spatial frequency cutoff at the image plane 21 is $F_c$utoff=

$$\frac{W}{\lambda di}$$

in which $W$ equals the width of the transparent strips of the grating, $\lambda$ equals the wavelengths of the light falling upon the grating, and $di$ equals the distance between the grating and the image plane.

FIG. 3 shows a normalized response curve for the horizontal spatial frequency at the image plane 21 for light passing through the grating 16. For incoherent light, such as that reflected by a scene to be televised, the response of the astigmatic filter 16 is maximum at the points A and D of FIG. 3, and is minimum between the points B and C. As indicated in FIG. 3, the points of maximum and minimum response at the image plane 21 are functions of the width $W$ of the strips 15 and the spacing $S+W$ of the strips. The responsive curve of filter 16 is periodic but the practical frequency limitations of a television system such as the maximum frequency response of the pickup tube and the imposed transmission bandwidth restrictions limit the region of interest in the spatial frequency spectrum.

The width $S$ of strips 17 of lesser transmissivity is made slightly greater than the width $W$ of strips 15 of greater transmissivity. That portion of the spatial frequency spectrum of minimum response, represented by the portion B to C of FIG. 3, is determined by the amount that strips 17 are of greater width than strips 15. The strip pattern of the astigmatic filter 16 extends over the entire exit pupil of the lens 14, thus allowing approximately 50 percent of the light passing through the lines 14 to pass through the filter 16. This arrangement provides maximum light transmission efficiency. The repetitive strip pattern of filter 16 has little difference in effect over a single-split aperture on the spatial frequency response in the region of interest. In practice the slits may be in the order of a few mils wide, depending on the desired cutoff frequency and the geometry of the lenses used in a particular camera.

Point B of FIG. 3 may be at the carrier frequency of the lower frequency, or –B, color component signal and may be at 3.5 mc. which frequency is determined by the color encoding filter previously described. The point C may be at the highest color component carrier frequency and may be at 5.0 mc. as previously described. Thus, it is shown that the width of the astigmatic filter strips may be selected such that the luminance signal passing therethrough is at a minimum response portion of the horizontal spatial frequency spectrum at the image plane 21 in the region of the color component carrier signals. In this manner there will be a selected reduction of crosstalk between the higher frequency luminance signals and the chrominance signals. The luminance signal will be contained in that portion of the spatial frequency spectrum under 3.5 mc. as represented by the A to B portion of the response curve of FIG. 3. If desired, the luminance signal derived from the pickup tube may be applied to a conventional horizontal aperture correction circuit to restore horizontal detail to the luminance signal.

I claim:

1. In a color television camera utilizing a spatial color-encoding filter in the optical path of a camera pickup tube to separate the light from a scene to be televised into its constituent colors, apparatus for reducing the luminance-to-chrominance signal crosstalk, comprising:

a single astigmatic filter having alternate and parallel strips of different transmissivity for filtering light passing therethrough disposed in said optical path of said pickup tube between said scene to be televised and said color encoding filter whereby; and the spacing between said alternate and parallel strips determines the spatial frequency response of the light from said scene impinging upon said color filter, said spacing being selected such that the highest frequency luminance signal components obtained from said pickup tube are below the lowest carrier frequency of the color signal components.

2. Apparatus according to claim 1 wherein said astigmatic filter is a grating having its alternate strips of lesser transmissivity of greater width than its alternate strips of greater transmissivity, said grating being disposed at the exit pupil of the objective lens of said camera.

3. Apparatus according to claim 2 wherein the width of said strips of greater transmissivity is such that the spatial cutoff frequency of the light passing through said grating is around the carrier frequency of the lowest color component signal derived from said color-encoding filter.

4. Apparatus according to claim 3 wherein said grating is further disposed such that said parallel and alternate strips are perpendicular to the direction of the scanning lines at the target of said pickup tube, whereby the luminance signals of a frequency higher than said lowest color component carrier frequency in the direction of said scanning lines are reduced.

5. In a color television camera including a color-encoding filter in the optical path of said camera for separating light from a scene to be televised into color component signals at different carrier frequencies at the photosensitve element of an image pickup tube of said camera, apparatus for reducing the luminance-to-chrominance signal crosstalk comprising a single astigmatic filter disposed in said optical path ahead of said color-encoding filter for determining the spatial frequency response of the light reaching said color-encoding filter such that said spatial frequency response is in a direction of the scanning lines of said pickup tube and is selected such that the highest frequency luminance signal components obtained from said pickup tube are below the lowest frequency color carrier frequency.

6. Apparatus according to claim 5 wherein said astigmatic filter includes alternate and parallel strips of different transmissivity.

7. Apparatus according to claim 6 wherein said strips are of unequal width.

8. Apparatus according to claim 7 wherein said alternate strips of lesser transmissivity are of greater width than said strips of greater transmissivity.

9. Apparatus according to claim 7 wherein said astigmatic filter is disposed at the exit pupil of the camera lens.

10. Apparatus according to claim 6 wherein said parallel strips are disposed perpendicular to the direction of the scanning lines of said pickup tube.

11. Apparatus according to claim 10 wherein said astigmatic filter means comprises a grating having alternate and parallel strips of different transmissivity.

12. Apparatus according to claim 11 wherein said astigmatic filter means is further disposed at the exit pupil of said camera lens.

13. Apparatus according to claim 12 wherein said alternate strips of lesser transmissivity are of greater width than said alternate strips of greater transmissivity.

14. In a color television camera including a lens, a spatial color-encoding filter for dividing light from an object into color component signals at different carrier frequencies;

an image pickup tube;

said lens, color encoding filter and pickup tube being disposed in the optical path of said camera in the order named, apparatus for reducing the luminance-to-chrominance signal crosstalk comprising:

a single astigmatic filter having alternate and parallel strips of different transmissivity disposed in said optical path for producing a spatial frequency response of an image in the plane of said color-encoding filter such that said spatial frequency response is minimum at that portion of the spatial frequency spectrum including the color component carrier frequencies spectrum including the color component carrier frequencies of said color-encoding filter and is maximum for the luminance signal components.

14. Apparatus according to claim 14 wherein said astigmatic filter means is further disposed such that said strips are perpendicular to the scanning lines of said pickup tube whereby said spatial frequency spectrum response in a direction of said scanning lines is determined by said astigmatic filter means.

16. Apparatus according to claim 14 wherein said strips are of unequal width.

UNITED STATES PATENT OFFICE
CERTIFICATE OF CORRECTION

Patent No. 3,566,013 Dated February 23, 1971

Inventor(s) Albert Macovski

It is certified that error appears in the above-identified patent and that said Letters Patent are hereby corrected as shown below:

Column 2, line 14, "lends" should read -- lens --. Column line 30, "9of" should read -- 9 of --; line 34, "any" should r -- may --; lines 45 and 46, "$F_c$ u-toff" should read -- $F_{cutoff}$ Column 4, line 57, "saId" should read -- said --. Column 6, li 13 and 14, cancel "spectrum including the color component carı frequencies"; line 17, "14.", first occurrence, should read -- --.

Signed and sealed this 9th day of November 1971.

(SEAL)
Attest:

EDWARD M.FLETCHER,JR.
Attesting Officer

ROBERT GOTTSCHALK
Acting Commissioner of Pater